(12) United States Patent
McCarthy et al.

(10) Patent No.: US 10,286,484 B1
(45) Date of Patent: May 14, 2019

(54) SYSTEMS AND METHODS FOR ADDITIVE MANUFACTURING CALIBRATION

(71) Applicant: General Electric Company, Schenectady, NY (US)

(72) Inventors: Brian Scott McCarthy, Schenectady, NY (US); Subhrajit Roychowdhury, Schenectady, NY (US); Mohammed Shalaby, Niskayuna, NY (US); Victor Petrovich Ostroverkhov, Ballston Lake, NY (US); Michael Evans Graham, Slingerlands, NY (US); William Thomas Carter, Galway, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/869,760

(22) Filed: Jan. 12, 2018

(51) Int. Cl.
*B33Y 10/00* (2015.01)
*B33Y 30/00* (2015.01)
(Continued)

(52) U.S. Cl.
CPC .......... *B23K 26/042* (2015.10); *B22F 3/1055* (2013.01); *B29C 64/153* (2017.08);
(Continued)

(58) Field of Classification Search
CPC ... B23K 26/042; B29C 64/153; B29C 64/245; B29C 64/393; B29C 64/268;
(Continued)

(56) References Cited

U.S. PATENT DOCUMENTS

| 5,430,666 A | 7/1995 | Deangelis et al. |
| 6,483,596 B1 | 11/2002 | Philippi et al. |

(Continued)

FOREIGN PATENT DOCUMENTS

| DE | 19804666 C1 | 2/2000 |
| WO | 2017009830 A1 | 1/2017 |

OTHER PUBLICATIONS

Vegard Brotan, "A new method for determining and improving the accuracy of a powder bed additive manufacturing machine", The International Journal of Advanced Manufacturing Technology, vol. 74, Issue: 9-12, pp. 1187-1195, Oct. 2014.

*Primary Examiner* — Nicole M Ippolito
(74) *Attorney, Agent, or Firm* — GE Global Patent Opertion; John Darling

(57) ABSTRACT

An additive manufacturing system including a consolidation device, a build platform, an optical detector, and a controller is provided. The consolidation device is configured to form a build layer of a component. The build platform is configured to rotate about a build platform rotation axis extending along a first direction. The optical detector is configured to detect locations of at least two alignment marks. The controller is configured to receive locations of the at least two alignment marks from the optical detector. The controller is also configured to determine the locations of the build platform rotation axis and a build platform rotation center point based on a comparison between the at least two alignment marks, wherein the build platform rotation center point lies along the build platform rotation axis. The controller is further configured to control the consolidation device to consolidate a plurality of particles on the build platform.

20 Claims, 11 Drawing Sheets

(51) Int. Cl.
*B33Y 50/02* (2015.01)
*B23K 26/042* (2014.01)
*B29C 64/393* (2017.01)
*B29C 64/245* (2017.01)
*G05B 19/401* (2006.01)
*B22F 3/105* (2006.01)
*B29C 64/268* (2017.01)
*B29C 64/153* (2017.01)
*B33Y 40/00* (2015.01)

(52) U.S. Cl.
CPC .......... *B29C 64/245* (2017.08); *B29C 64/268* (2017.08); *B29C 64/393* (2017.08); *G05B 19/4015* (2013.01); *B33Y 10/00* (2014.12); *B33Y 30/00* (2014.12); *B33Y 40/00* (2014.12); *B33Y 50/02* (2014.12)

(58) Field of Classification Search
CPC ... B22F 3/1055; G05B 19/4015; B33Y 10/00; B33Y 30/00; B33Y 40/00; B33Y 50/02
USPC ..... 250/491.1, 440.11, 441.11, 442.11, 443.1
See application file for complete search history.

(56) References Cited

U.S. PATENT DOCUMENTS

| | | | |
|---|---|---|---|
| 8,237,788 B2 | 8/2012 | Cooper et al. | |
| 2004/0033679 A1* | 2/2004 | Jacobson | B82Y 10/00 438/510 |
| 2008/0260964 A1 | 10/2008 | Bagavath-Singh et al. | |
| 2009/0326866 A1* | 12/2009 | Stewart | B82Y 15/00 702/179 |
| 2010/0090161 A1* | 4/2010 | Mason | B29C 39/006 252/182.11 |
| 2010/0200545 A1* | 8/2010 | Koelmel | C23C 16/4584 216/58 |
| 2015/0273768 A1 | 10/2015 | Wyatt et al. | |

* cited by examiner

SYSTEMS AND METHODS FOR ADDITIVE MANUFACTURING CALIBRATION

BACKGROUND

The subject matter described herein relates generally to additive manufacturing systems, and, more particularly, to rotary additive manufacturing systems including calibration apparatuses.

At least some additive manufacturing systems involve the consolidation of a particulate material to make a component. Such techniques facilitate producing complex components from expensive materials at a reduced cost and with improved manufacturing efficiency. At least some known additive manufacturing systems, such as Direct Metal Laser Melting (DMLM), Selective Laser Melting (SLM), Direct Metal Laser Sintering (DMLS), and LaserCusing® systems, fabricate components using a focused energy source, such as a laser device or an electron beam generator, a build platform, and a particulate, such as, without limitation, a powdered metal. (LaserCusing is a registered trademark of Concept Laser GmbH of Lichtenfels, Germany.) In at least some additive manufacturing systems, the build platform is rotated about a build platform center axis relative to a consolidation device while a build layer of particulate material is scanned by the laser beam emitted by the consolidation device. However, in at least some known systems, the rotary additive manufacturing system must be calibrated based at least partially on the location of the build platform center axis and a build layer center point of rotation that lies along the build platform center axis. The consolidation of a component in the rotary additive manufacturing system is at least partially dependent on a determination of the build platform center axis and the build layer center point of rotation to prevent the formation of seams and alignment defects within the component, the determination of which may require substantial amounts of time.

BRIEF DESCRIPTION

In one aspect, an additive manufacturing system is provided. The additive manufacturing system includes at least one consolidation device, a build platform, an optical detector, and a controller. The at least one consolidation device is configured to form a build layer of a component. The build platform is configured to rotate about a build platform rotation axis extending along a first direction. The optical detector is configured to detect locations of at least two alignment marks, the at least two alignment marks located on at least one of the build platform and the build layer. The controller includes a processing device and a memory device coupled to the processing device. The controller is configured to receive locations of the at least two alignment marks from the optical detector. The controller is also configured to determine the locations of the build platform rotation axis and a build platform rotation center point based on a comparison between the at least two alignment marks, wherein the build platform rotation center point lies along the build platform rotation axis. The controller is further configured to control the at least one consolidation device to consolidate at least a portion of a plurality of particles on the build platform based at least partially on the locations of the determined build platform rotation axis and the determined build platform rotation center point.

In another aspect, a controller for use in an additive manufacturing system is provided. The additive manufacturing system includes at least one consolidation device and a build platform configured to rotate about a build platform rotation axis extending along a first direction, wherein the at least one consolidation device is configured to form a build layer of a component. The controller includes a processing device and a memory device coupled to the processing device. The controller is configured to receive locations of at least two alignment marks from an optical detector configured to detect the locations of the at least two alignment marks, the at least two alignment marks located on at least one of the build platform and the build layer. The controller is also configured to determine the locations of the build platform rotation axis and a build platform rotation center point based on a comparison between the locations of the at least two alignment marks, wherein the build platform rotation center point lies along the build platform rotation axis. The controller is further configured to control the at least one consolidation device to consolidate at least a portion of a plurality of particles on the build platform based at least partially on the location of the determined build platform rotation axis and the determined build platform rotation center point.

In yet another aspect, a method of fabricating a component using an additive manufacturing system is provided. The method includes rotating a build platform about a build platform rotation axis relative to an optical detector. The method also includes detecting locations of at least two alignment marks using the optical detector, the at least two alignment marks located on at least one of the build platform and a build layer of a component on the build platform. The method further includes receiving, by a controller, the locations of the at least two alignment marks. The method includes determining, by the controller, locations of the build platform rotation axis and a build platform rotation center point based on a comparison between the at least two alignment marks. The method also includes controlling, by the controller, at least one consolidation device to consolidate at least a portion of a plurality of particles on the build platform to form at least one build layer of the component based at least partially on the locations of the determined build platform rotation axis and the determined build platform rotation center point.

DRAWINGS

These and other features, aspects, and advantages of the present disclosure will become better understood when the following detailed description is read with reference to the accompanying drawings in which like characters represent like parts throughout the drawings, wherein.

Figure 1:
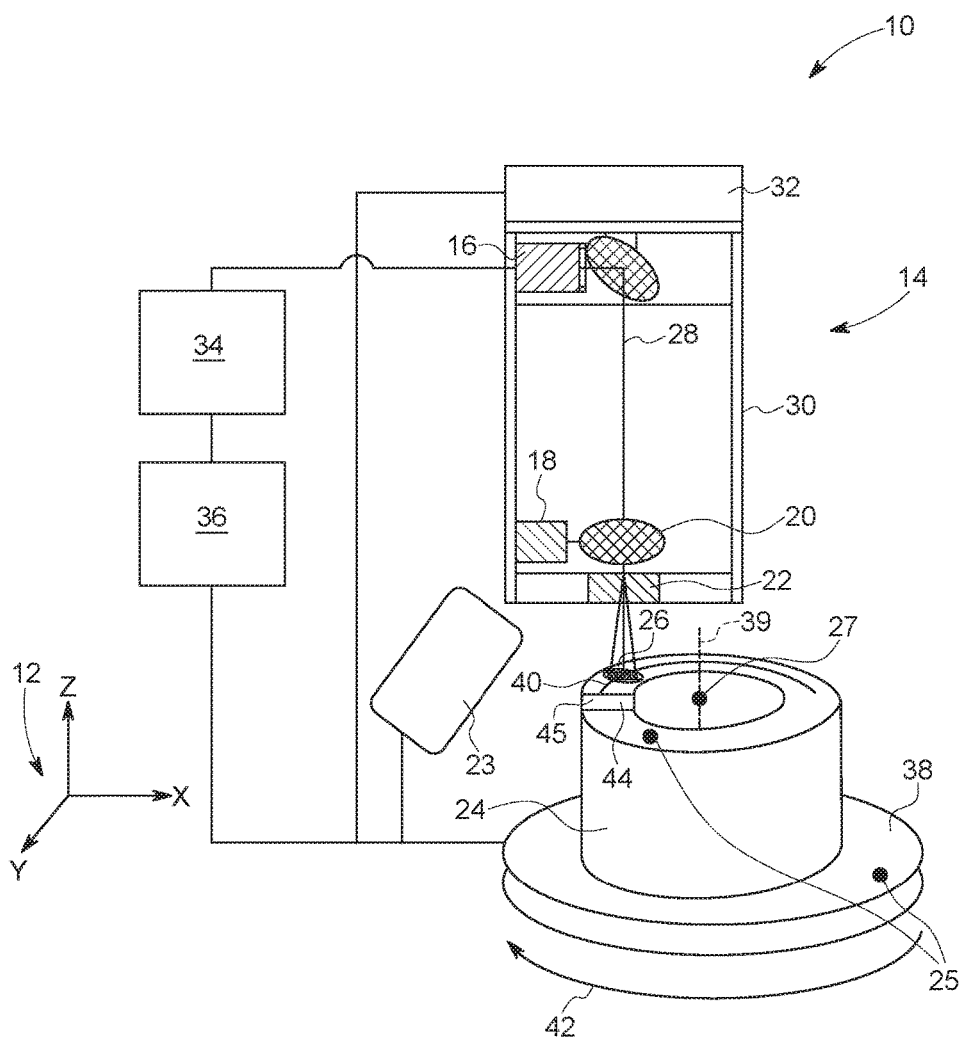
FIG. 1 is a schematic view of an exemplary rotary additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and methods described herein include additive manufacturing systems including at least one consolidation device, a build platform, an optical detector, and a controller. The at least one consolidation device is configured to consolidate at least a portion of a plurality of particles to form a build layer of a component. The build platform is configured to rotate about a build platform rotation axis extending along a first direction. The optical detector is configured to detect locations of at least two alignment marks, the at least two alignment marks located on at least one of the build platform and the build layer. The controller includes a processing device and a memory device coupled to the processing device. The controller is configured to receive locations of the at least two alignment marks from the optical detector and to determine the locations of the build platform rotation axis and a build platform rotation center point based on a comparison between the at least two alignment marks, wherein the build platform rotation center point lies along the build platform rotation axis. The controller is also configured to control the at least one consolidation device to consolidate at least a portion of the plurality of particles on the build platform based at least partially on the determined build platform rotation axis and the determined build platform rotation center point. The additive manufacturing systems described herein facilitate improving system efficiencies by reducing setup time, improving component quality by improving system calibration accuracy, and reducing the cost to additively manufacture the component.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

FIG. 1 is a schematic view of an exemplary rotary additive manufacturing system 10. A coordinate system 12 includes an X-axis, a Y-axis, and a Z-axis, the three axes orthogonal to each other. In the exemplary embodiment, rotary additive manufacturing system 10 includes a consolidation device 14 including a laser device 16, a scanning motor 18, a scanning mirror 20, and a scanning lens 22 for fabricating a component 24 using a layer-by-layer manufacturing process. Rotary additive manufacturing system 10 also includes an optical detector 23 configured to detect locations of at least two alignment marks 25 positioned on at least one of a build platform 38 and component 24. Alternatively, consolidation device 14 may include any component that facilitates consolidation of a material using any of the processes and systems described herein. Laser device 16 provides a high-intensity heat source configured to generate a melt pool 26 (not shown to scale) in a powdered material using an energy beam 28. Laser device 16 is contained within a housing 30 that is coupled to a mounting system 32. Rotary additive manufacturing system 10 also includes a computer control system, or controller 34.

Mounting system 32 is moved by an actuator or an actuator system 36 that is configured to move mounting system 32 in the X-direction, the Y-direction, and the Z-direction to cooperate with scanning mirror 20 to facilitate fabricating a layer of component 24 within rotary additive manufacturing system 10. For example, and without limitation, mounting system 32 is pivoted about a central point, moved in a linear path, a curved path, and/or rotated to cover a portion of the powder on a circular build platform 38 to facilitate directing energy beam 28 along the surface of a plurality of particles 45 of a build layer 44 to form a layer of component 24. Alternatively, housing 30 and energy beam 28 are moved in any orientation and manner that enables rotary additive manufacturing system 10 to function as described herein.

Scanning motor 18 is controlled by controller 34 and is configured to move mirror 20 such that energy beam 28 is reflected to be incident along a predetermined path along build platform 38, such as, for example, and without limitation, a linear and/or rotational scan path 40. In the exemplary embodiment, the combination of scanning motor 18 and scanning mirror 20 forms a two-dimension scan galvanometer. Alternatively, scanning motor 18 and scanning mirror 20 may include a three-dimension (3D) scan galvanometer, dynamic focusing galvanometer, and/or any other method that may be used to deflect energy beam 28 of laser device 16.

In the exemplary embodiment, build platform 38 is rotated along a rotation direction 42 about a build platform rotation axis 39 by actuator system 36 to facilitate continuous deposition, distribution, and consolidation of particles 45. As described above with respect to mounting system 32, actuator system 36 is also configured to move consolidation device 14 in a Z direction (i.e., normal to a top surface of build platform 38) so that build layer 44 may be consolidated on top of a previously consolidated build layer 44. In the exemplary embodiment, one complete rotation of build platform along rotation direction 42 corresponds to a movement of consolidation device 14 along the Z-direction of approximately seventy microns. In some embodiments, actuator system 36 is also configured to move build platform 38 in the Z-direction and/or an XY plane. For example, and without limitation, in an alternative embodiment where housing 30 is stationary, actuator system 36 rotates build platform 38 along rotation direction 42 and in the X-direction and/or Y-direction to cooperate with scanning motor 18 and scanning mirror 20 to direct energy beam 28 of laser device 16 along scan path 40 about build platform 38. In the exemplary embodiment, actuator system 36 includes, for example, and without limitation, a linear motor(s), a hydraulic and/or pneumatic piston(s), a screw drive mechanism(s), and/or a conveyor system.

In the exemplary embodiment, rotary additive manufacturing system 10 is operated to fabricate component 24 from a computer modeled representation of the 3D geometry of component 24. The computer modeled representation may be produced in a computer aided design (CAD) or similar file. The CAD file of component 24 is converted into a layer-by-layer format that includes a plurality of build parameters for each layer of component 24, for example, a build layer 44 of component 24 including a plurality of particles 45 to be consolidated by rotary additive manufacturing system 10. In the exemplary embodiment, component 24 is modeled in a desired orientation relative to the origin of the coordinate system used in rotary additive manufacturing system 10. The geometry of component 24 is sliced into a stack of layers of a desired thickness, such that the geometry of each layer is an outline of the cross-section through component 24 at that particular layer location. Scan paths 40 are generated across the geometry of a respective layer. The build parameters are applied along scan path 40 to fabricate that layer of component 24 from particles 45 used to construct component 24. The steps are repeated for each respective layer of component 24 geometry. Once the process is completed, an electronic representation of scan paths 40 is generated, including all of the layers. The electronic representation of scan paths 40 is loaded into controller 34 of rotary additive manufacturing system 10 to control the system during fabrication of each layer.

After the electronic representation of scan paths 40 is loaded into controller 34, rotary additive manufacturing system 10 is operated to consolidated particles 45 to generate component 24 by implementing the layer-by-layer manufacturing process, such as a direct metal laser melting method. The exemplary layer-by-layer additive manufacturing process does not use a pre-existing article as the precursor to the final component, rather the process produces component 24 from a raw material in a configurable form, such as particles 45. For example, and without limitation, a steel component can be additively manufactured using a steel powder. Rotary additive manufacturing system 10 enables fabrication of components, such as component 24, using a broad range of materials, for example, and without limitation, metals, ceramics, glass, and polymers.

Figure 2:
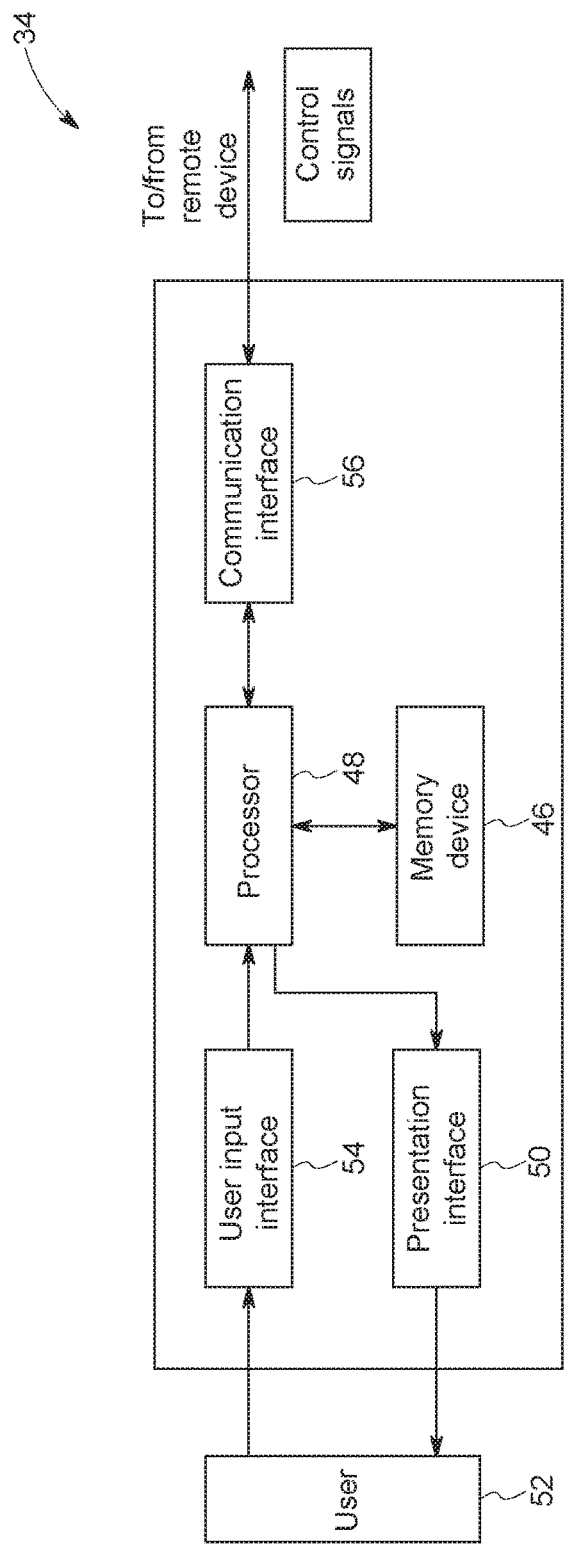
FIG. 2 is a block diagram of a controller that may be used to operate the rotary additive manufacturing system shown in FIG. 1.

FIG. 2 is a block diagram of controller 34 that may be used to operate rotary additive manufacturing system 10 (shown in FIG. 1). In the exemplary embodiment, controller 34 is any type of controller typically provided by a manufacturer of rotary additive manufacturing system 10 to control operation of rotary additive manufacturing system 10. Controller 34 executes operations to control the operation of rotary additive manufacturing system 10 based at least partially on instructions from human operators. Controller 34 includes, for example, a 3D model of component 24 to be fabricated by rotary additive manufacturing system 10. Operations executed by controller 34 include controlling power output of laser device 16 (shown in FIG. 1) and adjusting mounting system 32 and/or build platform 38, via actuator system 36 (all shown in FIG. 1) to control the scanning velocity of energy beam 28. Controller 34 is also configured to control scanning motor 18 to direct scanning mirror 20 to further control the scanning velocity of energy beam 28 within rotary additive manufacturing system 10. Controller 34 is further configured to receive locations of alignment marks 25 from optical detector 23 to determine locations of a build platform rotation axis 39 and a build platform rotation center point 27 based on a comparison between alignment marks 25. In alternative embodiments, controller 34 may execute any operation that enables rotary additive manufacturing system 10 to function as described herein.

In the exemplary embodiment, controller 34 includes a memory device 46 and a processor 48 coupled to memory device 46. Processor 48 may include one or more processing units, such as, without limitation, a multi-core configuration. Processor 48 is any type of processor that permits controller 34 to operate as described herein. In some embodiments, executable instructions are stored in memory device 46. Controller 34 is configurable to perform one or more operations described herein by programming processor 48. For example, processor 48 may be programmed by encoding an operation as one or more executable instructions and providing the executable instructions in memory device 46. In the exemplary embodiment, memory device 46 is one or more devices that enable storage and retrieval of information such as executable instructions or other data. Memory device 46 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 46 may be configured to store any type of data, including, without limitation, build parameters associated with component 24. In some embodiments, processor 48 removes or "purges" data from memory device 46 based on the age of the data. For example, processor 48 may overwrite previously recorded and stored data associated with a subsequent time or event. In addition, or alternatively, processor 48 may remove data that exceeds a predetermined time interval. In addition, memory device 46 includes, without limitation, sufficient data, algorithms, and commands to facilitate monitoring of build parameters and the geometric conditions of component 24 being fabricated by rotary additive manufacturing system 10.

In some embodiments, controller 34 includes a presentation interface 50 coupled to processor 48. Presentation interface 50 presents information, such as the operating conditions of rotary additive manufacturing system 10, to a user 52. In one embodiment, presentation interface 50 includes a display adapter (not shown) coupled to a display device (not shown), such as a cathode ray tube (CRT), a liquid crystal display (LCD), an organic LED (OLED) display, or an "electronic ink" display. In some embodiments, presentation interface 50 includes one or more display devices. In addition, or alternatively, presentation interface 50 includes an audio output device (not shown), for example, without limitation, an audio adapter or a speaker (not shown).

In some embodiments, controller 34 includes a user input interface 54. In the exemplary embodiment, user input interface 54 is coupled to processor 48 and receives input from user 52. User input interface 54 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 50 and user input interface 54.

In the exemplary embodiment, a communication interface 56 is coupled to processor 48 and is configured to be coupled in communication with one or more other devices, such as laser device 16, and to perform input and output operations with respect to such devices while performing as an input channel. For example, communication interface 56 may include, without limitation, a wired network adapter, a wireless network adapter, a mobile telecommunications adapter, a serial communication adapter, or a parallel communication adapter. Communication interface 56 may receive a data signal from or transmit a data signal to one or more remote devices. For example, in some embodiments, communication interface 56 of controller 34 may transmit/receive a data signal to/from actuator system 36.

Presentation interface 50 and communication interface 56 are both capable of providing information suitable for use with the methods described herein, such as, providing information to user 52 or processor 48. Accordingly, presentation interface 50 and communication interface 56 may be referred to as output devices. Similarly, user input interface 54 and communication interface 56 are capable of receiving information suitable for use with the methods described herein and may be referred to as input devices.

In the exemplary embodiment, controller 34 is configured to receive locations of alignment marks 25 from optical detector 23. Controller 34 is also configured to determine locations of build platform rotation axis 39 and build platform rotation center point 27 based on a comparison between the locations of alignment marks 25, as will be described below in detail, wherein build platform rotation center point 27 lies along build platform rotation axis 39. Controller 34 is further configured to control consolidation device 14 to consolidate at least a portion of plurality of particles 45 on build platform 38 based at least partially on the locations of determined build platform rotation axis 39 and determined build platform rotation center point 27. In alternative embodiments, controller 34 may execute any operation that enables rotary additive manufacturing system 10 to function as described herein.

Figure 3:
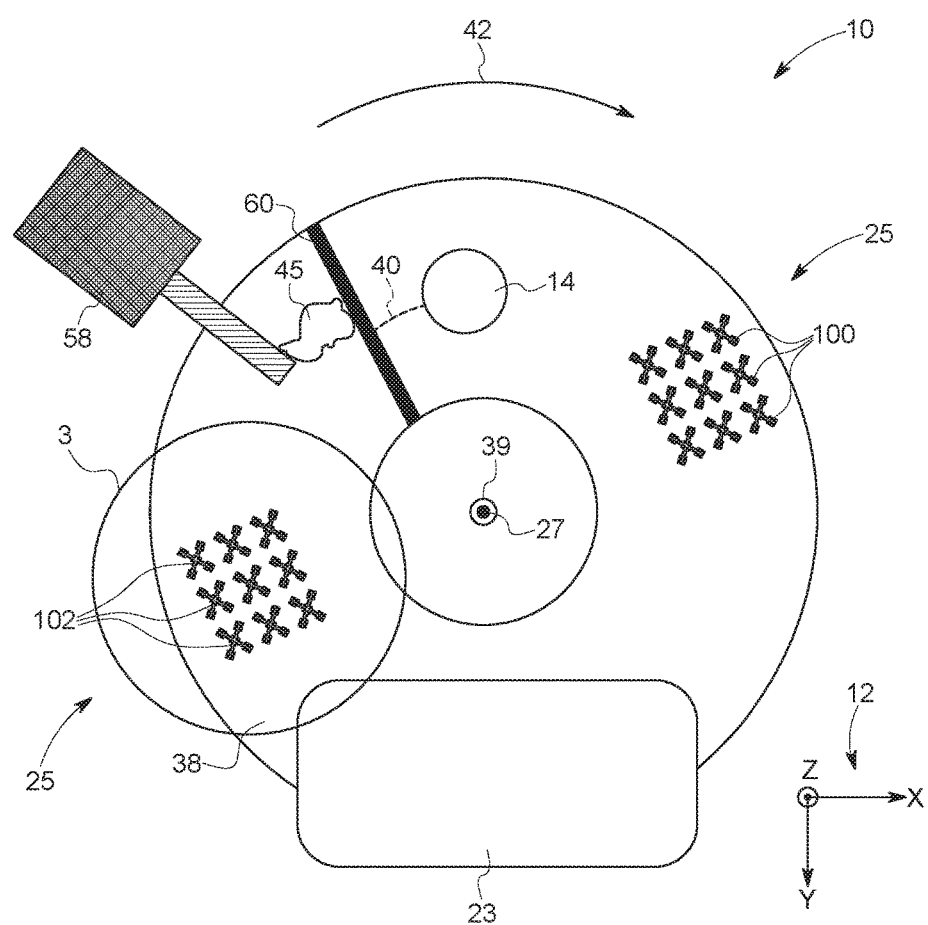
FIG. 3 is a plan schematic view of the exemplary rotary additive manufacturing system shown in FIG. 1 illustrating a plurality of exemplary alignment marks.
Figure 4:
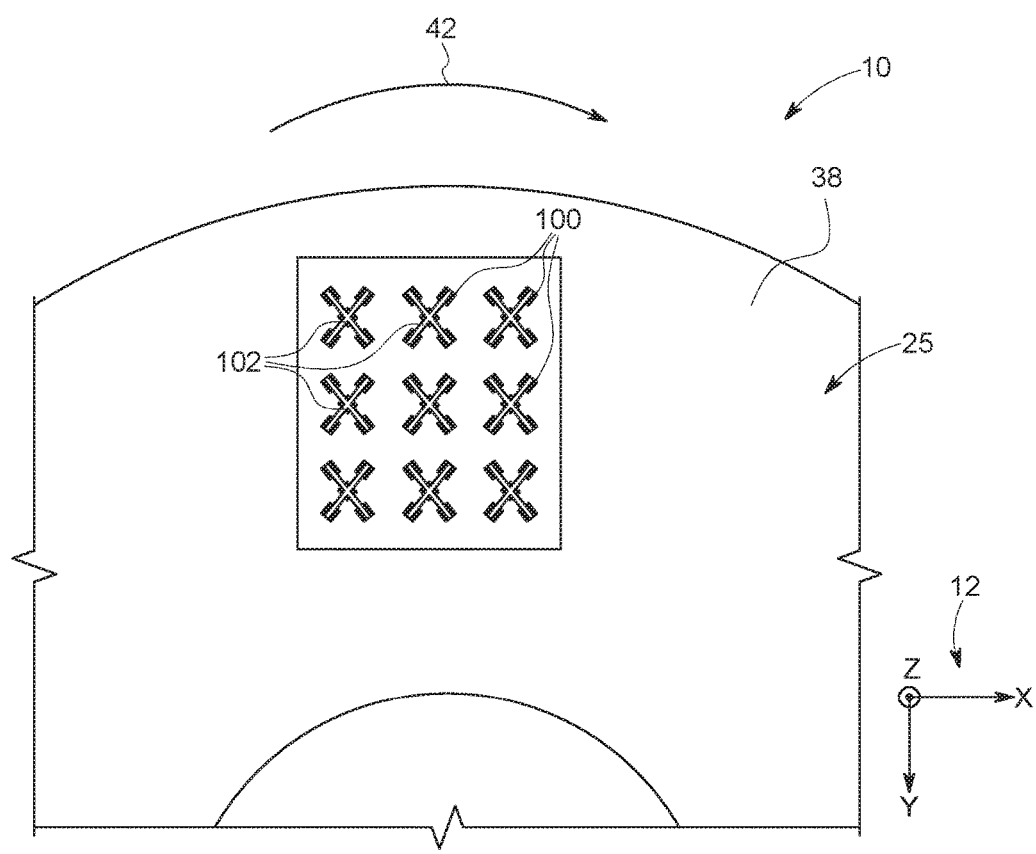
FIG. 4 is an enlarged plan schematic view of region 3 shown in FIG. 3 illustrating an overlaid plurality of the alignment marks shown in FIG. 3.

FIG. 3 is a plan schematic view of rotary additive manufacturing system 10 (shown in FIG. 1) illustrating a plurality of alignment marks 25. FIG. 4 is an enlarged plan schematic view of region 3 (shown in FIG. 3) illustrating an overlaid plurality of alignment marks 25 (shown in FIG. 3). In the exemplary embodiment, a particle delivery device 58 is configured to deliver plurality of particles 45 to build platform 38. A recoating device 60 is configured to distribute plurality of particles 45 to form build layer 44 on build platform 38. Alignment marks 25 include a plurality of first alignment marks 100 and a plurality of second alignment marks 102. In the exemplary embodiment, first alignment marks 100 are positioned opposite second alignment marks 102 on build platform 38. In alternative embodiments, second alignment marks 102 may be positioned on build platform 38 at any angle of rotation of build platform 38 relative to first alignment marks 100 that facilitates operation of rotary additive manufacturing system 10 as described herein.

In the exemplary embodiment, controller 34 controls laser device 16 of consolidation device 14 to project energy beam 28 to be incident on build platform 38 to form first alignment marks 100. In the exemplary embodiment, after first alignment marks 100 are made on build platform 38, controller 34 controls build platform 38 to rotate along rotation direction 42 by one hundred-eighty degrees while consolidation device 14 remains stationary. In an alternative embodiment, controller 34 may control build platform to rotate along rotation direction 42 by any angle that facilitates operation of additive manufacturing system 10 as described herein. Controller 34 then controls laser device 16 to project energy beam 28 to be incident on build platform to form second alignment marks 102. In an alternative embodiment, laser device 16 may project energy beam 28 to be incident on component 24. In further alternative embodiments, consolidation device 14 may form any alignment mark 25 in any order that facilitates operation of rotary additive manufacturing system 10 as described herein.

In the exemplary embodiment, optical detector 23 detects the locations of alignment marks 25 and transmits the locations to controller 34. Controller 34 determines the locations of build platform rotation center point 27 and build platform rotation axis 39 by comparing the locations of alignment marks 25. In the exemplary embodiment, controller 34 is configured to determine the location first alignment marks 100 and second alignment marks 102 relative to each other using the location data received from optical detector 23. In alternative embodiments, controller 34 determines the locations of first alignment marks 100 and second alignment marks 102 in any manner that facilitates operation of rotary additive manufacturing system 10 as described herein.

In the exemplary embodiment, using the determined locations of first alignment marks 100 and second alignment marks 102 relative to each other, controller 34 determines the locations of build platform rotation axis 39 and build platform rotation center point 27, which lies along build platform rotation axis 39, by using a matrix approximation using a first matrix and a second matrix to find an orthogonal matrix which most closely maps the first matrix to the second matrix. This "best fit" approach approximates a translation and a rotation of first alignment marks 100, expressed in homogeneous coordinates, to bring first alignment marks 100 into alignment with second alignment marks 102. To characterize the translation and rotation motion of first alignment marks 100 as a rotation about build platform rotation axis 39 and build platform rotation center point 27, the following equation is used:

$$\begin{bmatrix} 1 & 0 & xc \\ 0 & 1 & yc \\ 0 & 0 & 1 \end{bmatrix} \begin{bmatrix} \cos(\theta) & -\sin(\theta) & 0 \\ \sin(\theta) & \cos(\theta) & 0 \\ 0 & 0 & 1 \end{bmatrix} \begin{bmatrix} 1 & 0 & -xc \\ 0 & 1 & -yc \\ 0 & 0 & 1 \end{bmatrix} = \begin{bmatrix} \cos(\theta m) & -\sin(\theta m) & xm \\ \sin(\theta m) & \cos(\theta m) & ym \\ 0 & 0 & 1 \end{bmatrix} \quad \text{Eq. 1A}$$

Equation 1A may be simplified into the following equation:

$$\begin{bmatrix} xm \\ ym \end{bmatrix} = \begin{bmatrix} 1-\cos(\theta m) & \sin(\theta m) \\ -\sin(\theta m) & 1-\cos(\theta m) \end{bmatrix} \begin{bmatrix} xc \\ yc \end{bmatrix} \quad \text{Eq. 1B}$$

Using equation 1B, coordinates xc and yc may be solved for to determine the location of build platform rotation center point 27 relative to coordinate system 12 for a given build layer 44. In the exemplary embodiment, build platform rotation center point 27 may move along build platform rotation axis 39 in the Z-direction as the overall height of component 24, relative to the Z-direction, increases. In alternative embodiments, build platform rotation center point 27 may be determined using any equations that facilitate operation of additive manufacturing system 10 as described herein.

Figure 5:
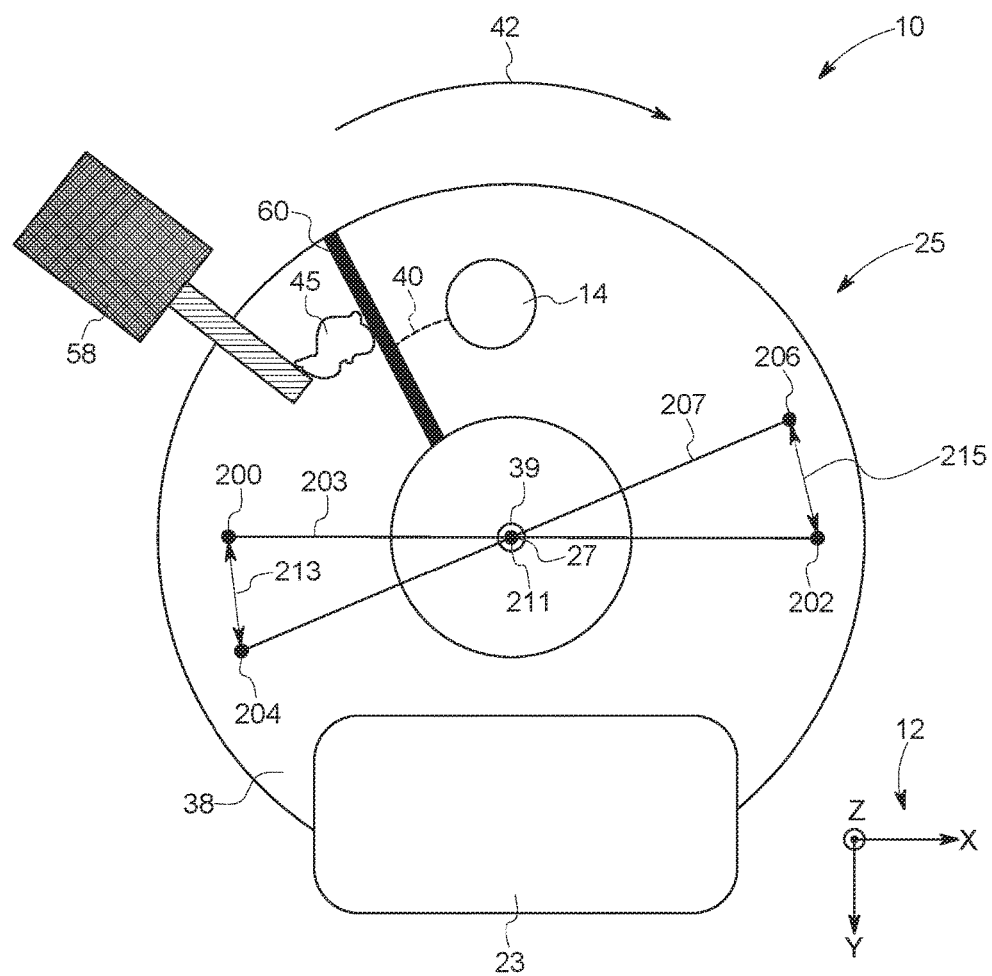
FIG. 5 is a plan schematic view of the rotary additive manufacturing system shown in FIG. 1 illustrating another plurality of the alignment marks.

FIG. 5 is a plan schematic view of rotary additive manufacturing system 10 (shown in FIG. 1) illustrating another plurality of alignment marks 25. Alignment marks 25 include a first side first alignment mark 200, a second side first alignment mark 202, a first side second alignment mark 204, and a second side second alignment mark 206. First side first alignment mark 200 is positioned opposite second side first alignment mark 202 on build platform 38, defining a first, straight line 203 therebetween. First side second alignment mark 204 is positioned opposite second side second alignment mark 206 on build platform 38, defining a second, straight line 207 therebetween. In alternative embodiments, first side first alignment mark 200, second side first alignment mark 202, first side second alignment mark 204, and second side second alignment mark 206 may be located in any position that facilitates operation of rotary additive manufacturing system 10 as described herein.

In the exemplary embodiment, controller 34 controls laser device 16 of consolidation device 14 to project energy beam 28 to be incident on build platform 38 to form first side first alignment mark 200 and first side second alignment mark 204. In an alternative embodiment, consolidation device 14 may project energy beam 28 to be incident on component 24 to form first side first alignment mark 200 and first side second alignment mark 204. In the exemplary embodiment, after first side first alignment mark 200 and first side second alignment mark 204 are made on build platform 38, controller 34 controls build platform 38 to rotate along rotation direction 42 by one hundred-eighty degrees while consolidation device 14 remains stationary. Controller 34 then controls laser device 16 to project energy beam 28 to be incident on build platform to form second side first alignment mark 202 and second side second alignment mark 206. In an alternative embodiment, laser device 16 may project energy beam 28 to be incident on component 24. In further alternative embodiments, consolidation device 14 may form any alignment mark 25 in any order that facilitates operation of rotary additive manufacturing system 10 as described herein.

In the exemplary embodiment, optical detector 23 detects the locations of alignment marks 25 and transmits the locations to controller 34. Controller 34 determines the locations of build platform rotation center point 27 and build platform rotation axis 39 by comparing the locations of alignment marks 25. More specifically, in the exemplary embodiment, controller 34 determines the locations of build platform rotation axis 39 and build platform rotation center point 27, which lies along build platform rotation axis 39, by determining the location of an intersection 211 of first line 203 and second line 207. The location of intersection 211 represents the location of build platform rotation center point 27 for a given build layer 44. In the exemplary embodiment, build platform rotation center point 27 may move along build platform rotation axis 39 in the Z-direction as the overall height of component 24, relative to the Z-direction, increases. In the exemplary embodiment, controller 34 is configured to determine the location of intersection 211 using the location data received from optical detector 23 by first determining a first side distance 213 defined between first side first alignment mark 200 and first side second alignment mark 204. Controller 34 then determines a second side distance 215 defined between second side first alignment mark 202 and second side second alignment mark 206. Controller 34 then determines the length of first line 203 and second line 207. Using trigonometric relationships, for example, the law of sines, controller 34 determines the location of intersection 211. In alternative embodiments, controller 34 determines the location of intersection 211 in any manner that facilitates operation of rotary additive manufacturing system 10 as described herein.

Figure 6:
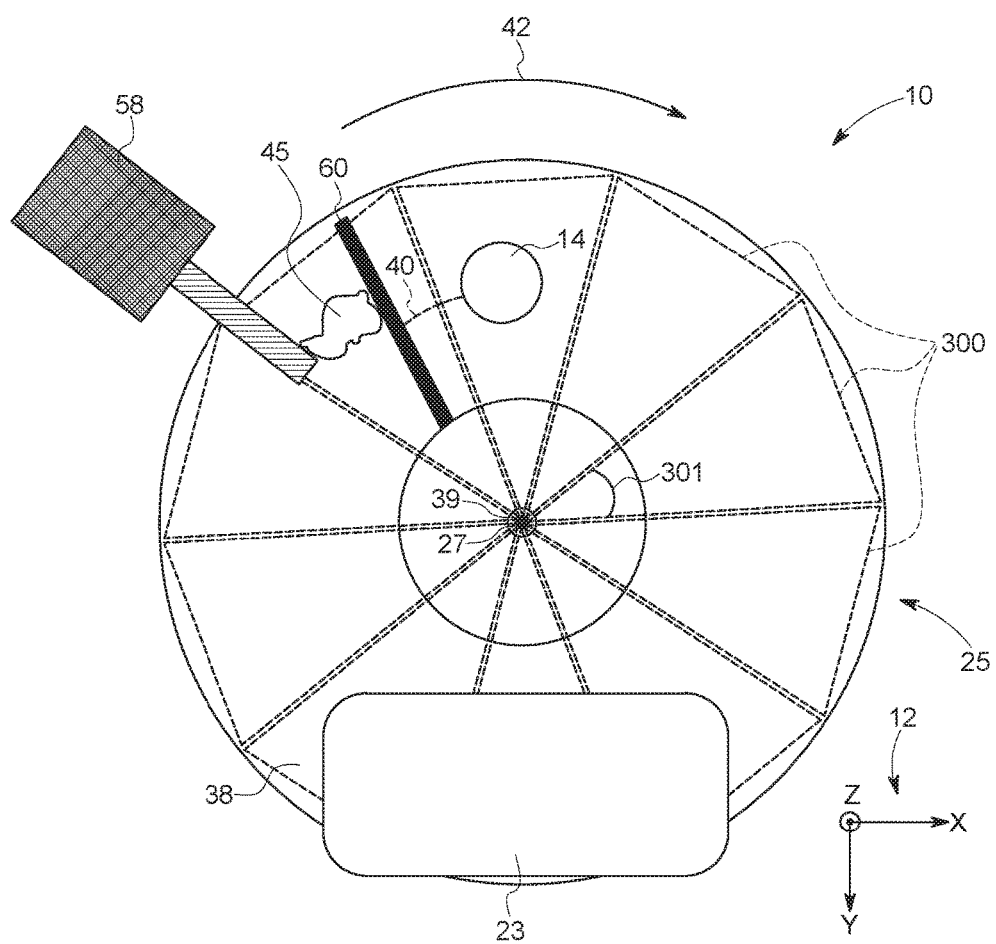
FIG. 6 is a plan schematic view of the rotary additive manufacturing system shown in FIG. 1 illustrating an exemplary plurality of an alternative embodiment of the alignment marks shown in FIG. 3.
Figure 7:
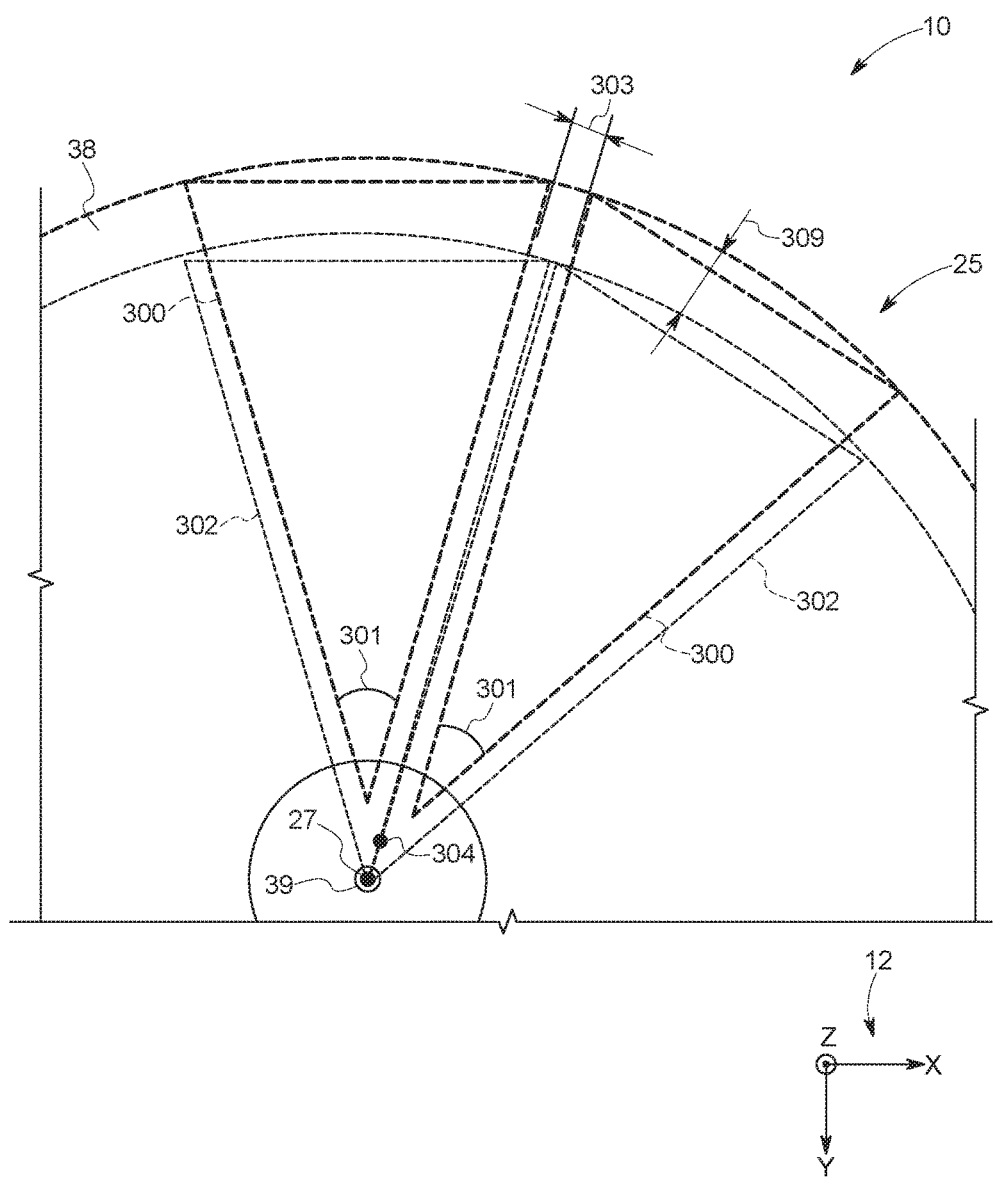
FIG. 7 is a top view of a portion of the build platform shown in FIG. 6 illustrating a first type of misalignment of the alternative alignment marks shown in FIG. 6.
Figure 8:
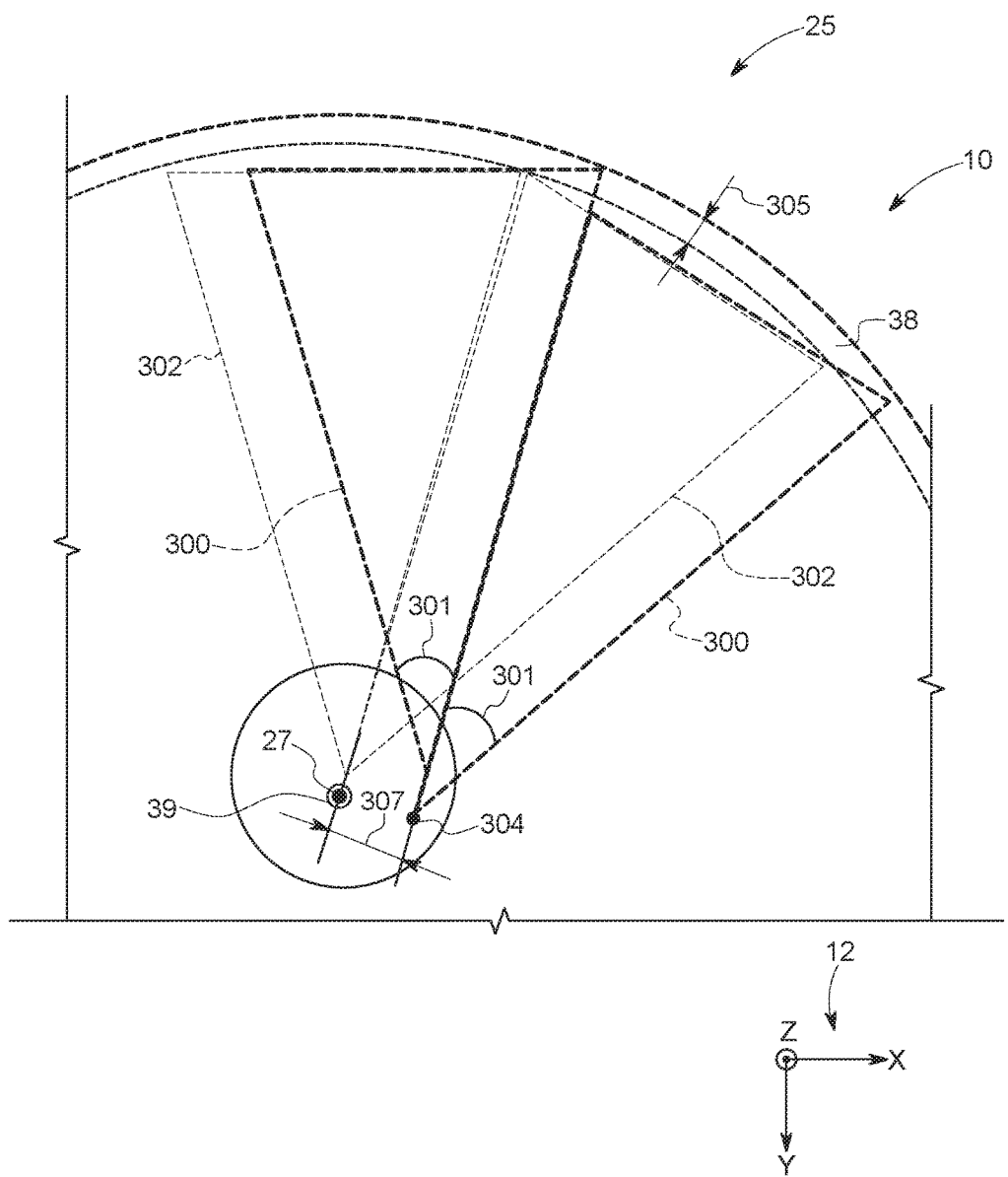
FIG. 8 is a top view of a portion of the build platform shown in FIG. 6 illustrating a second type of misalignment of the alternative alignment marks shown in FIG. 6.

FIG. 6 is a plan schematic view of rotary additive manufacturing system 10 (shown in FIG. 1) illustrating an alternative embodiment of alignment marks 25 (shown in FIG. 3). FIG. 7 is a top view of a portion of build platform 38 (shown in FIG. 6) illustrating a first type of alternative alignment mark 25 misalignment. FIG. 8 is a top view of a portion of build platform 38 (shown in FIG. 4) illustrating a second type of alternative alignment mark 25 misalignment. In the exemplary embodiment, alternative alignment marks 25 include a plurality of substantially similar pie-shaped alignment sectors 300 spaced adjacently along the surface of build platform 38. In alternative embodiments, alignment sectors 300 may be of any shape and size that facilitates operation of rotary additive manufacturing machine 10 as described herein.

In the exemplary embodiment, controller 34 receives an image of build platform 38 from optical detector 23 and estimates an approximate location of an estimated build platform rotation center point 304 and an approximate surface area of build platform 38. Based on estimated build platform rotation center point 304 and build platform surface area, controller 34 determines the size and location, relative to build platform 38, of a plurality of adjacently located estimated alignment sectors 302. The relative locations of plurality of estimated alignment sectors 302 are determined by controller 34 such that plurality of estimated alignment sectors 302 are sized and positioned to extend radially outward from estimated build platform rotation center point 304 in an XY-plane in a sufficient quantity to substantially cover a three hundred and sixty degree area of build platform 38 surrounding estimated build platform rotation center point 304. In the exemplary embodiment, plurality of estimated alignment sectors 302 includes ten substantially similar triangular-shaped estimated alignment sectors 302, each estimated alignment sector 302 having a substantially similar first angle 301. In alternative embodiments, plurality of estimated alignment sectors 302 may include as many estimated alignment sectors 302 of any shape and size as facilitates operation of rotary additive manufacturing system 10 as described herein.

In the exemplary embodiment, based on estimated build platform rotation center point 304 and plurality of estimated alignment sectors 302, controller 34 controls laser device 16 of consolidation device 14 to project energy beam 28 to be incident on build platform 38 to form at least two alignment sectors 300 as build platform 38 is caused to rotate by a fixed angle. In an alternative embodiment, consolidation device 14 may project energy beam 28 to be incident on component 24 to form at least two alignment sectors 300 on component 24. In the exemplary embodiment, controller 34 controls build platform 38 to rotate along rotation direction 42 by approximately sixty degrees while consolidation device 14 remains stationary to form two alignment sectors 300 on build platform 38. In alternative embodiments, consolidation device 14 may form as many alignment sectors 300 on build platform 28 as facilitates operation of rotary additive manufacturing system 10 as described herein.

In the exemplary embodiment, with reference to FIG. 7, optical detector 23 detects and transmits the locations of each alignment sector 300 to controller 34. Controller 34 determines the location of build platform rotation center point 27 and build platform rotation axis 39 by comparing the locations of alignment sectors 300 with the locations of corresponding estimated alignment sectors 302. More specifically, controller 34 determines the severity of scan field alignment errors and center point errors resulting from using estimated build platform rotation center point 304 to form alignment sectors 300 and applies a correction to estimated build platform rotation center point 304 to determine the location of build platform rotation center point 27. For example, as will be described below in further detail, after determining a value for the scan field alignment errors and the center point errors, the value of the errors, represented in the relevant coordinate system, will be applied to estimated build platform rotation center point 304 to determine the location of build platform rotation center point 27. In alternative embodiments, controller 34 determines the location of build platform rotation center point 27 in any manner that facilitates operation of rotary additive manufacturing system 10 as described herein.

In the exemplary embodiment, using image data received from optical detector 23, a scan field offset error 303, $\varepsilon_t$, a scan field radial error 305, $\varepsilon_r$, a center point spacing offset error 307, $\delta_t$, and a center point radial error 309, $\delta_r$, are measured and used to determine the location of build platform rotation center point 27. Scan field errors 303 and 305 are related to center point errors 307 and 309 by the following two equations:

$$\varepsilon_r = 2\delta_r \sin(\theta/2) \quad \text{Eq. 2A}$$

$$\varepsilon_r = 2\delta_t \sin(\theta/2) \quad \text{Eq. 2B}$$

where, once scan field errors 303 and 305 are known, a correction can be applied to the location of estimated build platform rotation center point 304 using center point errors 307 and 309 to determine the location of build platform rotation center point 27. The applied correction may be in the form of a distance from estimated build platform rotation center point 304 to build platform rotation center point 27 and an angle of a line representing the distance between estimated build platform rotation center point 304 and build platform rotation center point 27. Coordinates representing the location of build platform rotation center point 27 may then be determined using the applied correction. In the exemplary embodiment, scan field offset error 303, scan field radial error 305, center point spacing offset error 307, and center point radial error 309 are measured in a homogeneous coordinate system. In alternative embodiments, any type of scan field error and center point error may be calculated using any type of coordinate system, for example, but not limited to, a number line coordinate system, a Cartesian coordinate system, a polar coordinate system, a cylindrical coordinate system, and a spherical coordinate system. In further alternative embodiments, any equation may be used to determine the location of build platform rotation center point 27 that facilitates operation of rotary additive manufacturing system 10 as described herein.

Figure 9:
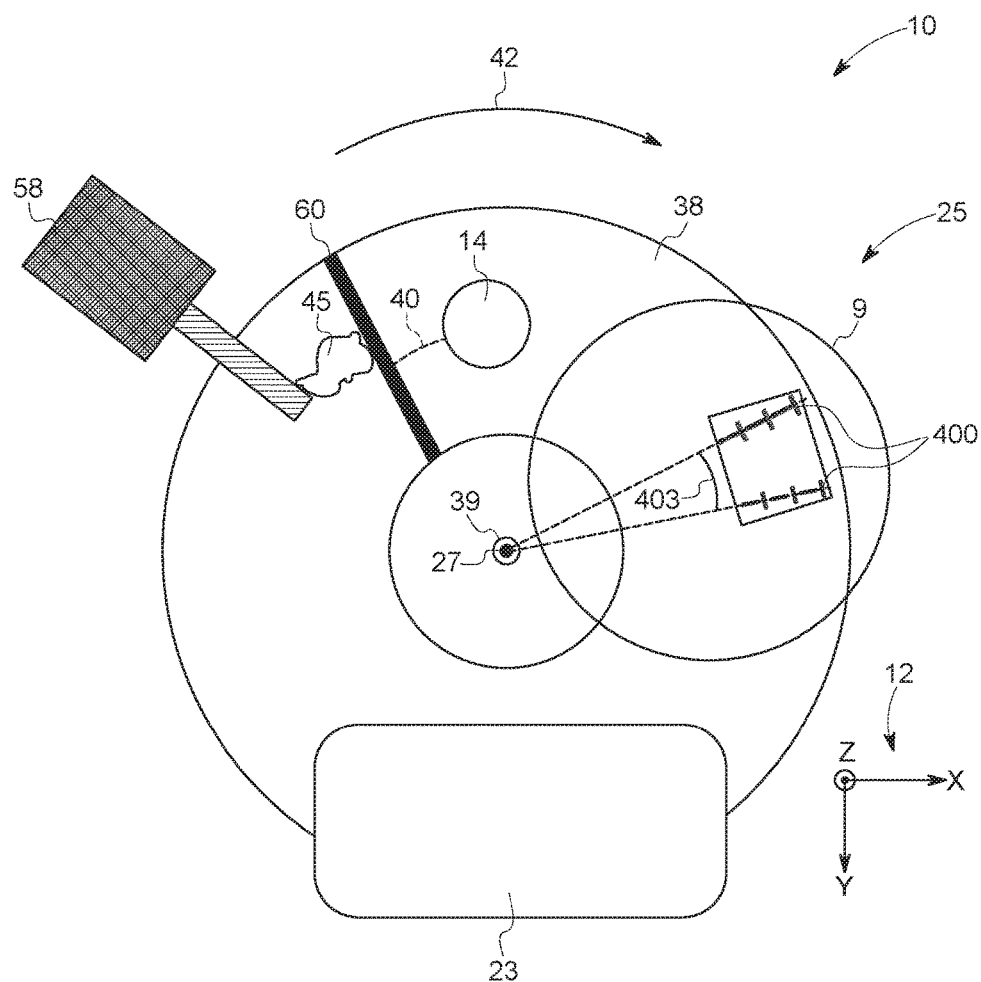
FIG. 9 is a plan schematic view of the rotary additive manufacturing system shown in FIG. 1 illustrating an alternative embodiment of the alignment marks shown in FIG. 6.
Figure 10:
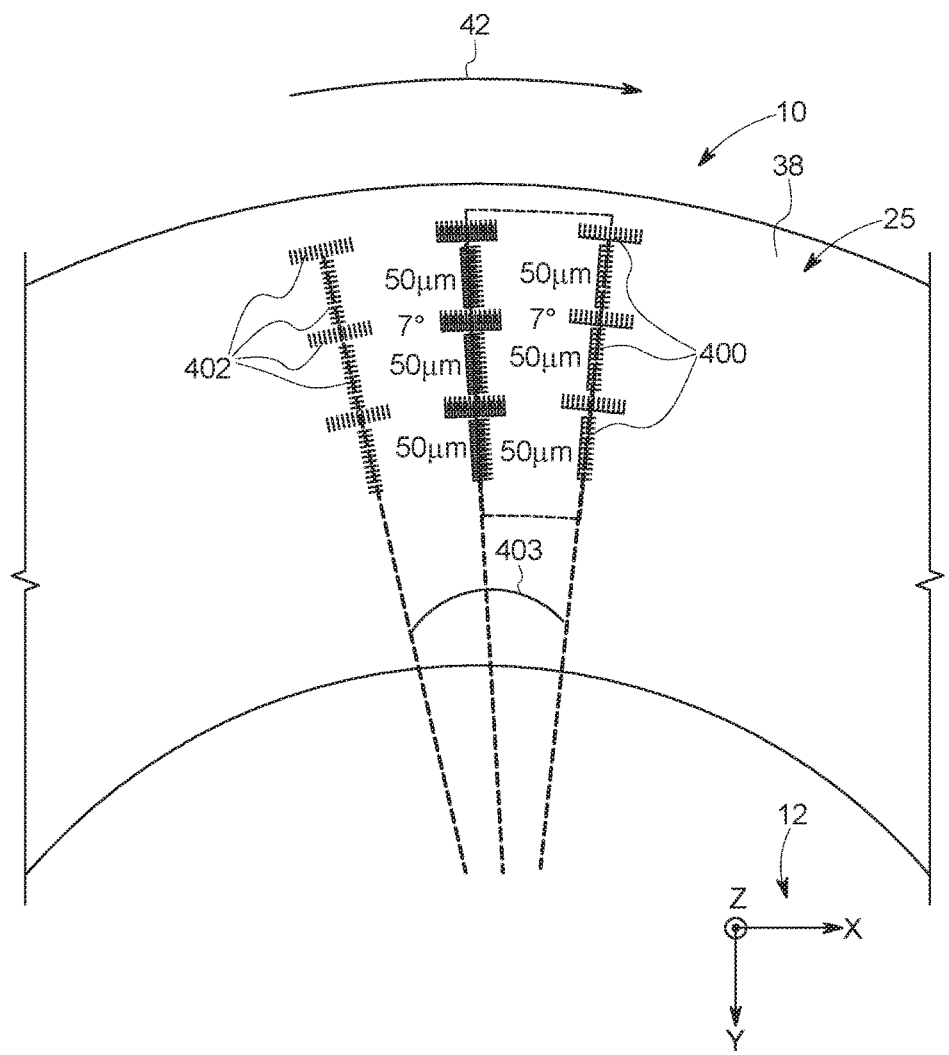
FIG. 10 is an enlarged plan schematic view of region 9 shown in FIG. 9 illustrating the alternative alignment marks shown in FIG. 9.

FIG. 9 is a plan schematic view of rotary additive manufacturing system 10 (shown in FIG. 1) illustrating an alternative embodiment of alignment marks 25 (shown in FIG. 6). FIG. 10 is an enlarged plan schematic view of region 9 (shown in FIG. 9) illustrating an overlaid pair of the alternative embodiment of alignment marks 25 (shown in FIG. 6). The embodiment shown in FIGS. 9 and 10 is substantially identical to the embodiment shown in FIG. 6, except alignment marks 25 are vernier alignment scales 400. In the exemplary embodiment, build platform 38 includes two vernier alignment scales 400, each vernier alignment scale 400 including a plurality of graduations 402. A vernier angle 403 is defined between each vernier alignment scale 400 relative to build platform rotation center point 27. In the exemplary embodiment, vernier angle 403 is approximately fourteen degrees. In the exemplary embodiment, controller 34 determines the locations of build platform rotation axis 39 and build platform rotation center point 27 using a method substantially identical to the method described for the embodiment shown in FIGS. 7 and 8, except scan field errors 303 and 305 and center point errors 307 and 309 are determined using vernier alignment scale 400 graduations 402. In an alternative embodiment, build platform 38 may include any configuration of vernier alignment scales 400 in any number that facilitates operation of rotary additive manufacturing system 10 as is described herein.

Figure 11:
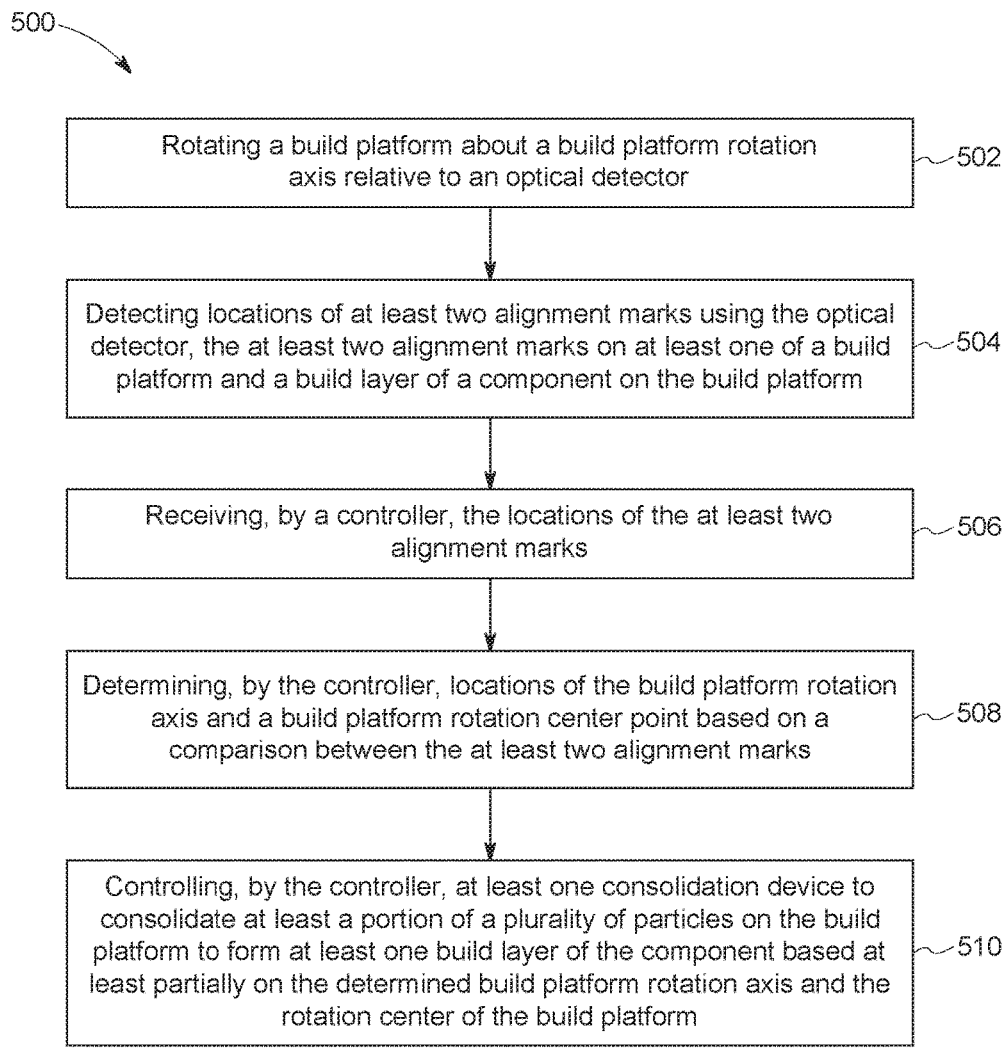
FIG. 11 is a flowchart of an exemplary method that may be used to fabricate a component using the rotary additive manufacturing systems shown in FIG. 1.

FIG. 11 is a flowchart of an exemplary method that may be used to fabricate a component 24 using rotary additive manufacturing system 10. Referring to FIGS. 1-10, method 500 includes rotating 502 a build platform 38 about a build platform rotation axis 39 relative to an optical detector 23. Method 500 also includes detecting 504 locations of at least two alignment marks 25 using optical detector 23, the at least two alignment marks 25 on at least one of build platform 38 and a build layer 44 of a component 24 on build platform 38. Method 500 further includes receiving 506, by a controller 34, the locations of at least two alignment marks 25. Method 500 includes determining 508, by controller 34, locations of build platform rotation axis 39 and a build platform rotation center point 27 based on a comparison between the at least two alignment marks 25. Finally, method 500, includes controlling 510, by controller 34, at least one consolidation device 14 to consolidate at least a portion of a plurality of particles on build platform 38 to form at least one build layer 44 of component 24 based at least partially on the locations of determined build platform rotation axis 39 and determined build platform rotation center point 27.

The embodiments described herein include additive manufacturing systems including at least one consolidation device, a build platform, an optical detector, and a controller. The at least one consolidation device is configured to consolidate at least a portion of a plurality of particles to form a build layer of a component. The build platform is configured to rotate about a build platform rotation axis extending along a first direction. The optical detector is configured to detect locations of at least two alignment marks, the at least two alignment marks located on at least one of the build platform and the build layer. The controller includes a processing device and a memory device coupled to the processing device. The controller is configured to receive locations of the at least two alignment marks from the optical detector and to determine the locations of the build platform rotation axis and a build platform rotation center point based on a comparison between the at least two alignment marks, wherein the build platform rotation center point lies along the build platform rotation axis. The controller is also configured to control the at least one consolidation device to consolidate at least a portion of the plurality of particles on the build platform based at least partially on the determined build platform rotation axis and the build platform rotation center point. The additive manufacturing systems facilitate improving system efficiencies by reducing setup time, improving component quality by improving system calibration accuracy, and reducing the cost to additively manufacture the component.

An exemplary technical effect of the methods, systems, and apparatus described herein includes at least one of: a) improving additive manufacturing system efficiency, b) reducing the calibration time for a rotary additive manufacturing system, c) reducing the required build time for an additively manufactured component, d) improving the production rate of additively manufacturing a component, e) improving the quality of an additively manufactured component, and f) reducing the cost of additively manufacturing a component.

Exemplary embodiments of rotary additive manufacturing systems that include calibration apparatuses are described above in detail. The additive manufacturing systems, and methods of using such systems are not limited to the specific embodiments described herein, but rather, components of systems and/or steps of the methods may be utilized independently and separately from other components and/or steps described herein. For example, the methods may also be used in combination with other additive manufacturing systems, and are not limited to practice with only the rotary additive manufacturing systems, and methods as described herein. Rather, the exemplary embodiment can be implemented and utilized in connection with many other additive manufacturing systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system comprising:
   at least one consolidation device configured to form a build layer of a component;
   a build platform configured to rotate about a build platform rotation axis extending along a first direction;
   an optical detector configured to detect locations of at least two alignment marks, the at least two alignment marks located on at least one of said build platform and the build layer; and
   a controller including a processing device and a memory device coupled to said processing device, said controller configured to:
      receive locations of the at least two alignment marks from said optical detector;
      determine the locations of the build platform rotation axis and a build platform rotation center point based on a comparison between the locations of the at least two alignment marks, wherein the build platform rotation center point lies along the build platform rotation axis; and
      control said at least one consolidation device to consolidate at least a portion of a plurality of particles on said build platform based at least partially on the determined build platform rotation axis and the determined build platform rotation center point.

2. The additive manufacturing system of claim 1, wherein said consolidation device comprises a laser device, and wherein said controller is further configured to control said laser device to etch the at least two alignment marks located on at least one of said build platform and the build layer.

3. The additive manufacturing system of claim 1, wherein at least one of said build platform and said at least one consolidation device is configured to move along the first direction.

4. The additive manufacturing system of claim 1, wherein the at least two alignment marks include a plurality of first alignment marks and a plurality of second alignment marks, and wherein said controller is configured to:
   approximate a translation and a rotation of the plurality of first alignment marks to bring the plurality of first alignment marks into alignment with the plurality of second alignment marks;
   characterize the translation and the rotation of the plurality of first alignment marks as a rotation about a build platform rotation axis and a build platform rotation center point; and
   determine a location of the build platform rotation axis and the build platform rotation center point based on the characterization of the translation and the rotation of the plurality of first alignment marks as the rotation about the build platform rotation axis and the build platform rotation center point.

5. The additive manufacturing system of claim 1, wherein the at least two alignment marks include a first side first alignment mark, a second side first alignment mark, a first side second alignment mark, and a second side second alignment mark, wherein the first side first alignment mark is positioned opposite the second side first alignment mark on said build platform wherein a first line is defined between the first side first alignment mark and the second side first alignment mark, wherein the first side second alignment mark is positioned opposite the second side second alignment mark, wherein a second line is defined between the first side second alignment mark and the second side second alignment mark, and wherein said controller is configured to determine the location of the build platform rotation axis and the build platform rotation center point by determining a location of an intersection of the first line and the second line.

6. The additive manufacturing system of claim 1, wherein said controller is further configured to:
   estimate locations of the build platform rotation axis and the build platform rotation center point based on an image of said build platform received from said optical detector; and
   control said at least one consolidation device to etch the at least two alignment marks located on said build platform.

7. The additive manufacturing system of claim 6, wherein the at least two alignment marks include at least two vernier alignment scales, wherein each vernier alignment scale includes a plurality of graduations.

8. The additive manufacturing system of claim 6, wherein the at least two alignment marks include at least two substantially similar sectors extending radially outward from the build platform rotation center point and spaced adjacently along at least one of said build platform and the component.

9. A controller for use in an additive manufacturing system including at least one consolidation device, the at least one consolidation device configured to form a build layer of a component, said controller including a processing device and a memory device coupled to said processing device, said controller configured to:
   receive locations of at least two alignment marks from an optical detector configured to detect the locations of the at least two alignment marks, the at least two alignment marks located on at least one of a build platform and the build layer;
   determine the locations of a build platform rotation axis extending along a first direction and a build platform rotation center point of the build platform based on a comparison between the locations of the at least two alignment marks, wherein the build platform rotation center point lies along the build platform rotation axis; and
   control the at least one consolidation device to consolidate at least a portion of a plurality of particles on the build platform based at least partially on the determined build platform rotation axis and the determined build platform rotation center point.

10. The controller in accordance with claim 9, wherein said controller is configured to control a consolidation device including a laser device configured to emit an energy beam, and wherein said controller is configured to control the consolidation device to etch the at least two alignment marks located on at least one of the build platform and the component.

11. The controller in accordance with claim 9, wherein at least one of the build platform and the at least one consolidation device is configured to move along the first direction.

12. The controller in accordance with claim 9, wherein the at least two alignment marks include a plurality of first alignment marks and a plurality of second alignment marks, and wherein said controller is configured to:
- approximate a translation and a rotation of the plurality of first alignment marks to bring the plurality of first alignment marks into alignment with the plurality of second alignment marks;
- characterize the translation and the rotation of the plurality of first alignment marks as a rotation about a build platform rotation axis and a build platform rotation center point; and
- determine a location of the build platform rotation axis and the build platform rotation center point based on the characterization of the translation and the rotation of the plurality of first alignment marks as the rotation about the build platform rotation axis and the build platform rotation center point.

13. The controller in accordance with claim 9, wherein said controller is configured to:
- determine the build platform rotation axis and the build platform rotation center point based on a comparison between the locations of a first side first alignment mark, a second side first alignment mark, a first side second alignment mark, and a second side second alignment mark, wherein the first side first alignment mark is positioned opposite the second side first alignment mark on the build platform, wherein a first line is defined between the first side first alignment mark and the second side first alignment mark, wherein the first side second alignment mark is positioned opposite the second side second alignment mark, and wherein a second line is defined between the first side second alignment mark and the second side second alignment mark; and
- determine the location of the build platform rotation center point by determining a location of an intersection of the first line and the second line.

14. The controller in accordance with claim 9, wherein said controller is further configured to:
- estimate locations of the build platform rotation axis and the build platform rotation center point based on an image of the build platform received from the optical detector; and
- control the at least one consolidation device to etch the at least two alignment marks located on the build platform.

15. The controller in accordance with claim 9, wherein said controller is configured to determine the location of the build platform rotation center point based on a comparison between the locations of a first vernier alignment scale and a second vernier alignment scale, wherein the first vernier alignment scale and the second vernier alignment scale include a plurality of graduations.

16. The controller in accordance with claim 9, wherein said controller is configured to determine the location of the build platform rotation center point based on a comparison between locations of at least two substantially similar sectors extending radially outward from the build platform rotation center point and spaced adjacently along at least one of the build platform and the component.

17. A method of fabricating a component using an additive manufacturing system, said method comprising:
- rotating a build platform about a build platform rotation axis relative to an optical detector;
- detecting locations of at least two alignment marks using the optical detector, the at least two alignment marks located on at least one of a build platform and a build layer of a component on the build platform;
- receiving, by a controller, the locations of the at least two alignment marks;
- determining, by the controller, locations of the build platform rotation axis and a build platform rotation center point based on a comparison between the at least two alignment marks; and
- controlling, by the controller, at least one consolidation device to consolidate at least a portion of a plurality of particles on the build platform to form at least one build layer of the component based at least partially on the locations of the determined build platform rotation axis and the determined build platform rotation center point.

18. The method in accordance with claim 17, wherein determining locations of the build platform rotation axis and the build platform rotation center point further comprises determining the build platform rotation axis and the build platform rotation center point based on a comparison between the locations of a first side first alignment mark, a second side first alignment mark, a first side second alignment mark, and a second side second alignment mark, wherein the first side first alignment mark is positioned opposite the second side first alignment mark on the build platform, wherein a first line is defined between the first side first alignment mark and the second side first alignment mark, wherein the first side second alignment mark is positioned opposite the second side second alignment mark, and wherein a second line is defined between the first side second alignment mark and the second side second alignment mark.

19. The method in accordance with claim 18, wherein determining locations of the build platform rotation axis and the build platform rotation center point further comprises determining a location of an intersection of the first line and the second line.

20. The method in accordance with claim 17, wherein rotating the build platform about the build platform rotation axis relative to an optical detector further comprises:
- estimating the locations of the build platform rotation axis and the build platform rotation center point based on an image of the build platform received from the optical detector; and
- controlling the at least one consolidation device to etch the at least two alignment marks located on the build platform.

* * * * *